United States Patent
Jeon et al.

(10) Patent No.: US 11,465,471 B2
(45) Date of Patent: Oct. 11, 2022

(54) DOOR FOR VEHICLE

(71) Applicants: HYUNDAI MOTOR COMPANY, Seoul (KR); KIA MOTORS CORPORATION, Seoul (KR); DUCKYANG IND. CO., LTD., Ulsan (KR)

(72) Inventors: Dongmin Jeon, Suwon-si (KR); Sae Hoon Oh, Ulsan (KR); Hi Su Cho, Ulsan (KR)

(73) Assignees: HYUNDAI MOTOR COMPANY, Seoul (KR); KIA MOTORS CORPORATION, Seoul (KR); DUCKYANG IND. CO., LTD., Ulsan (KR)

( * ) Notice: Subject to any disclaimer, the term of this patent is extended or adjusted under 35 U.S.C. 154(b) by 294 days.

(21) Appl. No.: 16/892,567

(22) Filed: Jun. 4, 2020

(65) Prior Publication Data
US 2021/0206243 A1 Jul. 8, 2021

(30) Foreign Application Priority Data

Jan. 8, 2020 (KR) ........................ 10-2020-0002683

(51) Int. Cl.
*B60J 5/04* (2006.01)
*B60J 1/08* (2006.01)

(52) U.S. Cl.
CPC .............. *B60J 5/0402* (2013.01); *B60J 1/08* (2013.01); *B60J 5/0416* (2013.01); *B60J 5/0429* (2013.01); *B60J 5/0443* (2013.01); *B60J 5/0451* (2013.01); *B60J 5/0456* (2013.01); *B60J 5/0463* (2013.01); *B60J 5/0469* (2013.01); *B60J 5/0481* (2013.01); *B60J 5/0484* (2013.01); *B60Y 2304/07* (2013.01)

(58) Field of Classification Search
CPC ...... B60J 5/0469; B60J 5/0466; B60J 5/0481; B60J 5/0484; B60J 5/0408; B60J 5/0401; B60J 5/0405; B60J 5/0406; B60J 5/0411; B60J 5/0463
USPC ............................................ 296/146.5–146.7
See application file for complete search history.

(56) References Cited

U.S. PATENT DOCUMENTS

| | | | | |
|---|---|---|---|---|
| 4,843,762 A * | 7/1989 | Grier | ...................... | B60J 5/0405 49/378 |
| 5,857,732 A * | 1/1999 | Ritchie | .................. | B60J 5/0433 49/502 |
| 5,904,002 A * | 5/1999 | Emerling | ................ | B60J 5/0418 49/502 |
| 6,561,567 B2 * | 5/2003 | Mrozowski | ........... | E05F 15/689 49/501 |

(Continued)

FOREIGN PATENT DOCUMENTS

KR 2019-0068672 A 6/2019

*Primary Examiner* — Gregory A Blankenship
(74) *Attorney, Agent, or Firm* — McDonnell Boehnen Hulbert & Berghoff LLP

(57) ABSTRACT

A vehicle door according to an exemplary embodiment enhances coupling strength through structural coupling by molding a window frame of a door module assembled between a door trim and the door panel with a separate aluminum injection product, and insert-injection molding a coupling portion of the window frame to a module body, and a groove is formed along the coupling portion of the window frame coupled to the module body to easily distinguish respective parts and serve to carry out sealing in injection molding.

8 Claims, 6 Drawing Sheets

(56) References Cited

U.S. PATENT DOCUMENTS

| | | | | |
|---|---|---|---|---|
| 7,914,066 B2* | 3/2011 | Miyake | ............... | B60S 1/0433 |
| | | | | 49/501 |
| 8,398,149 B2* | 3/2013 | Weiter | ............... | B60J 5/0412 |
| | | | | 296/146.6 |
| 9,610,829 B1* | 4/2017 | Stachewicz | ............ | B60J 5/0426 |
| 10,589,605 B2* | 3/2020 | Imbert | ............... | E05B 79/04 |
| 2002/0073627 A1* | 6/2002 | Hock | ............... | B60J 5/0406 |
| | | | | 49/502 |
| 2005/0110298 A1* | 5/2005 | Fin | ............... | B60J 5/0487 |
| | | | | 296/146.5 |
| 2005/0264028 A1* | 12/2005 | Bodin | ............... | B60J 5/0425 |
| | | | | 296/146.6 |
| 2007/0039245 A1* | 2/2007 | Buchta | ............... | E05F 11/382 |
| | | | | 49/502 |
| 2007/0261313 A1* | 11/2007 | Ruppert | ............... | B60J 5/0406 |
| | | | | 49/502 |
| 2007/0267889 A1* | 11/2007 | Flendrig | ............... | B60J 5/0416 |
| | | | | 296/202 |
| 2014/0132029 A1* | 5/2014 | Kuroki | ............... | B60J 5/0451 |
| | | | | 296/1.11 |
| 2021/0206243 A1* | 7/2021 | Jeon | ............... | B60J 5/0484 |

* cited by examiner

A-A

DOOR FOR VEHICLE

CROSS-REFERENCE TO RELATED APPLICATION

This application claims priority to and the benefit of Korean Patent Application No. 10-2020-0002683 filed in the Korean Intellectual Property Office on Jan. 8, 2020, the entire contents of which are incorporated herein by reference.

BACKGROUND

(a) Field

The present disclosure relates to a door for a vehicle. More particularly, the present disclosure relates to a vehicle door in which a window frame of a door module assembled between a door trim and a door panel is molded as a separate aluminum injection product, and a coupling portion of the window frame is insert-injection molded to the module body to enhance coupling strength through structural coupling.

(b) Description of the Related Art

In general, a door for a vehicle is provided with door glass to improve ventilation, occupant visibility, and habitability in the interior of the vehicle cabin, and is manufactured of a steel material or an aluminum material in consideration of collision safety.

A door outer panel and a door inner panel formed of such a steel or aluminum material are coupled with each other to form a door frame such that a door panel is formed, and a window frame is coupled to the door panel.

A glass module where a guider for lifting and lowering the door glass, an actuator, and the like are mounted is embedded in an internal space formed by coupling the door outer panel and the door inner panel.

In addition, the door trim where a door latch, a window switch, and the like are installed is coupled to the door inner panel, and an impact beam is installed corresponding to the door outer panel to increase side collision strength of the door.

The conventional vehicle door constructed in this way increases the weight of the overall door as the window frame and glass module guider assembled to the door inner panel are made of steel, and there is a drawback of increases the production work and the number of parts as the window frame and glass module are manufactured separately.

On the other hand, in recent years, more innovative vehicle doors are being developed through reduction of the number of parts of the door and weight reduction of materials.

The vehicle door disclosed in Korean Patent Laid-Open Publication No. 10-2019-0068672, published on Jun. 19, 2019, can reduce the number of parts of the door by modularizing a plurality of parts, and can reduce the weight by making some door modules using a relatively lightweight material instead of using a steel material.

In addition, the prior art aims to help reduce the number of assembly work steps and cost, and thus includes a first door module formed of a door outer panel, a door inner panel, a door frame, and an impact beam, a second door module formed of a lightweight material, and a door trim as a third door module.

The door outer panel is disposed outside the vehicle cabin and is formed into a complete panel shape in consideration of door strength and external appearance, while the door inner panel is disposed inside the vehicle cabin and has an opening in a center to reduce weight and cost.

The second door module is formed of a relatively lightweight material, for example, a plastic material, compared to the first door module, and a module body having a panel shape and a window frame portion forming a door window are integrally formed.

However, in the vehicle door of the prior art as described above, the window frame portion, which is the door window portion, is formed of a lightweight plastic composite material together with the module body, and thus a reinforcement bracket such as steel or other non-ferrous metal needs to be insert-molded for strength reinforcement.

Accordingly, the engaging force between the window frame portion formed of a composite material and the reinforcement bracket formed of the steel or non-ferrous metal is reduced due to the heterogeneity of the material therebetween.

In particular, when a torsional force or bending force due to an external force acts on the window frame portion, the reinforcement bracket insert-molded therein is separated or detached from the window frame portion.

Also, as the reinforcement bracket is exposed to the outside, the appearance quality is deteriorated.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a vehicle door in which a window frame of a door module assembled between a door trim and the door panel with a separate aluminum injection product, and a coupling portion of the window frame is insert-molded to a module body such that coupling strength can be enhanced through structural coupling.

In the exemplary embodiment of the present disclosure, a groove is formed along the coupling portion of the window frame coupled to the module body to easily distinguish respective parts and serve to carry out sealing in injection molding.

In order to achieve such an object, a vehicle door according to an exemplary embodiment of the present disclosure includes a door panel formed by bonding a door outer panel and a door inner panel, a door module that is formed of a module body and a window frame, and coupled to an inner side of the door inner panel, and a door trim coupled to an inner side of the door module, where the window frame is integrally formed through aluminum injection molding, and forms a coupling portion where a plurality of penetration holes are formed at a regular interval along a lower end portion that is coupled to the module body, and, in injection molding of a plastic resin, the coupling portion of the module body is insert-injection molded to the module body such that the plastic resin is structurally coupled by being cured while being introduced through the plurality of penetration holes formed in the coupling portion.

A groove may be formed in a constant shape along a length direction of the coupling portion in the window frame.

The plurality of penetration holes may be formed along an interior surface of the groove.

The plurality of penetration holes may be formed in the shape of a quadrangle.

An interior surface and an exterior surface of the coupling portion of the window frame may be insert-injection molded between an inner end and an outer end at an upper end portion of the module body.

In the injection molding, a stopper hole for insertion of a stopper of each mold may be formed in each of the inner end and the outer end of the module body to support the coupling at opposite sides.

The stopper hole may be formed in each of an inner end of the module body, corresponding to a lower portion of each penetration hole formed in the coupling portion, and an outer end of the module body, corresponding to a lower portion between the respective holes of the coupling portion.

A front end of the inner side may be formed in an interior surface of the groove formed in the coupling portion, and the outer end may be formed to surround an exterior surface of the groove formed in the coupling portion.

A connection portion that connects the inner end and the outer end through the penetration hole formed in the groove may be formed in the module body.

A vehicle door according to an exemplary embodiment of the present disclosure enhance coupling strength through structural coupling by molding a window frame of a door module assembled between a door trim and the door panel with a separate aluminum injection product, and insert-injection molding a coupling portion of the window frame to a module body such that the weight can be reduced to compared to a prior art, and rigidity of the window frame can be enhanced.

In addition, according to the present disclosure, in injection molding of the module body, coupling strength of the window frame and the module body can be enhanced through structural coupling through which the plastic resin is introduced through the penetration holes formed along the coupling portion of the window frame and then cured.

In addition, according to the present disclosure, the groove is formed along the coupling portion of the window frame coupled to the module body such that it is easy to distinguish from the module body and it can serve as a sealing during injection molding.

DETAILED DESCRIPTION OF THE EMBODIMENTS

Figure 1:
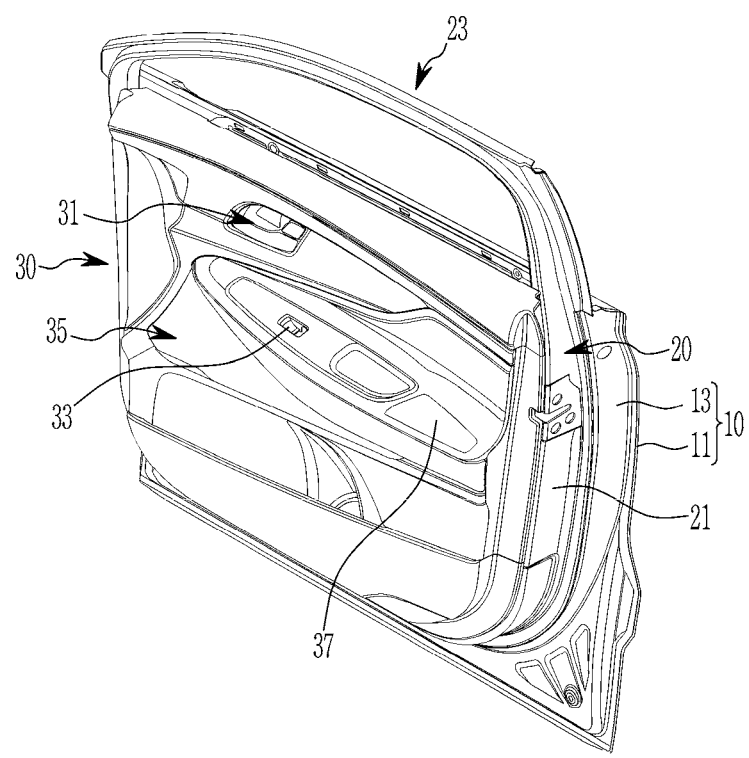
FIG. 1 is a perspective view of a vehicle door according to an exemplary embodiment of the present disclosure.

The present disclosure will be described more fully hereinafter with reference to the accompanying drawings, in which exemplary embodiments of the disclosure are shown.

As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

However, parts which are not related with the description are omitted for clearly describing the exemplary embodiment of the present disclosure, and like reference numerals refer to like or similar elements throughout the specification.

In the following description, dividing names of components into first, second, and the like is to divide the names because the names of the components are the same as each other, and an order thereof is not particularly limited.

In addition, unless explicitly described to the contrary, the word "comprise", and variations such as "comprises" or "comprising" will be understood to imply the inclusion of stated elements but not the exclusion of any other elements.

Figure 2:
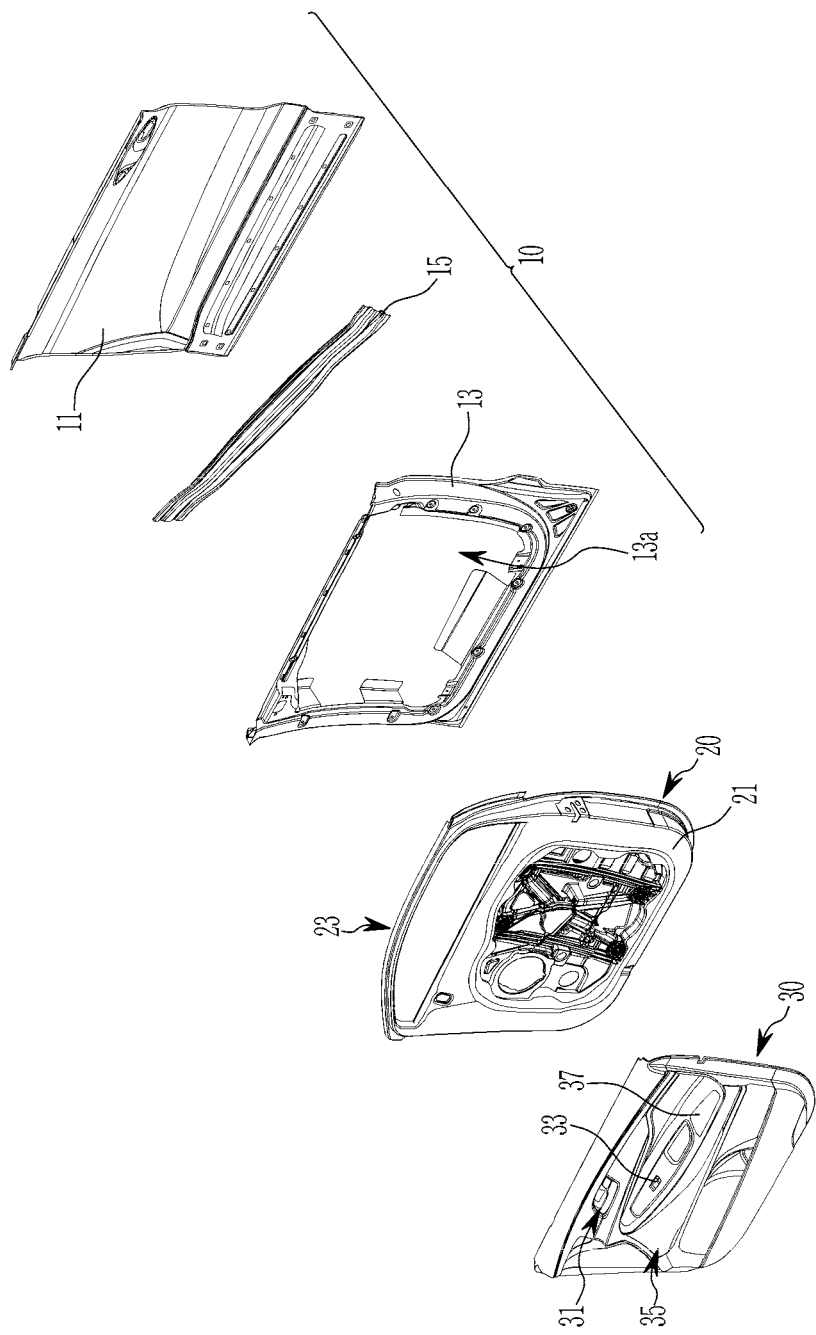
FIG. 2 is an exploded perspective view of the vehicle door according to the exemplary embodiment of the present disclosure.
Figure 3:
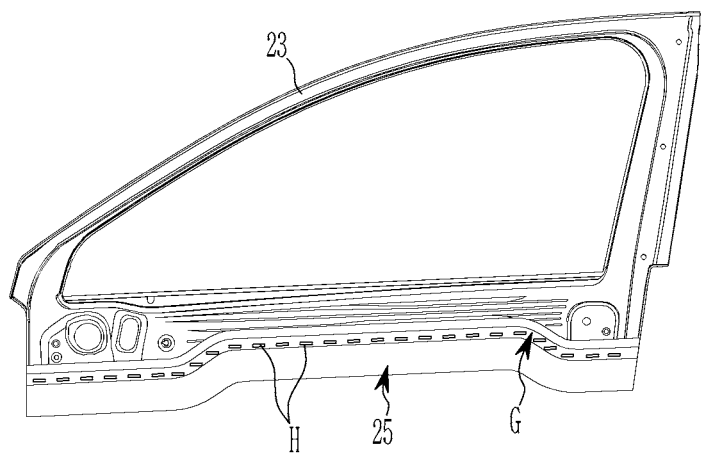
FIG. 3 is an enlarged view of a window frame applied to the vehicle door according to the exemplary embodiment of the present disclosure.
Figure 4:
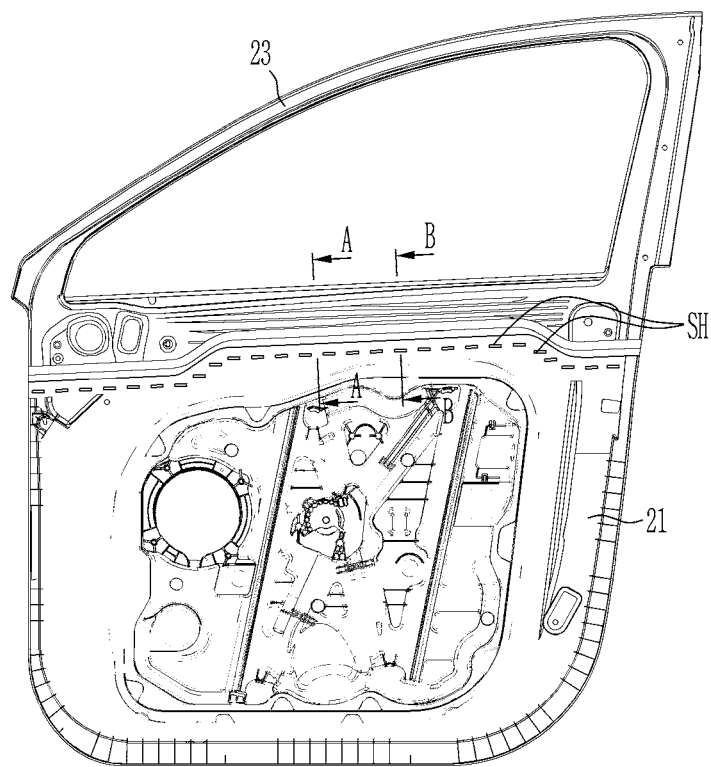
FIG. 4 is a perspective view of a door module applied to the vehicle door according to the exemplary embodiment of the present disclosure.

FIG. 1 is a perspective view of a vehicle door according to an exemplary embodiment of the present disclosure, FIG. 2 is an exploded perspective view of the vehicle door according to the exemplary embodiment of the present disclosure, FIG. 3 is an enlarged view of a window frame applied to the vehicle door according to the exemplary embodiment of the present disclosure, and FIG. 4 is a perspective view of a door module applied to the vehicle door according to the exemplary embodiment of the present disclosure.

Referring to FIG. 1 to FIG. 4, a vehicle door according to an exemplary embodiment of the present disclosure includes a door panel 10, a door module 20, and a door trim 30.

The door panel 10 is formed of a door outer panel 11, a door inner panel 13, and an impact beam 15.

The door outer panel 11 is disposed at an outer side of a vehicle body, and is formed in the shape of a whole panel in consideration of door strength and external appearance. The door inner panel 13 is disposed at an inner side of the vehicle cabin, and an opening 13a is formed in a center thereto to reduce the weight and cost.

The door outer panel 11 and the door inner panel 13 may be formed of a metallic material such as steel, for example.

The impact beam 15 is disposed corresponding to the door outer panel 11, and opposite ends thereof are bonded to the door inner panel 13. Such an impact beam 15 can protect an occupant inside the vehicle cabin by absorbing an impact in a side collision of the vehicle.

As described, edges of the door inner panel 13 and the door outer panel 11 are respectively coupled through a process such as hemming while opposite ends of the impact beam 15 are bonded to the door inner panel 13 such that the door panel 10 can be completed.

The door module 20 is formed of a module body 21 and a window frame 23.

The module body 21 may be formed by injection-molding a complex material consisting of a lightweight plastic resin.

The window frame 23 can be manufactured as an aluminum injection product formed integrally by injection molding a lightweight material of aluminum alloy material.

Such a door module 20 is coupled with an inner panel 13 of the door panel 10.

A lifting or lowering unit such as for a door glass (not shown), an actuator (not shown), a wire (not shown), a guider (not shown), and the like is formed in the inner space formed between the door module 20 and the door inner panel 13 to open and close the door glass (not shown) with respect to the window frame.

The window frame 23 is integrally formed through aluminum injection molding, and compared to a conventional window frame where a reinforcement bracket is insert-injection molded in a plastic resin, strength can be assured and weight can be reduced by reducing a thickness thereof.

Referring to FIG. 2, the door trim 30 is coupled to the door module 20 through a coupling unit, and may serve to function as soundproofing, sound absorbing, and occupant protection in case of collision as well as interior decoration.

In addition, the door trim 30 is configured with convenience items such as a door lock 31, a window switch 33, a speaker 35, and an arm rest 37 may be integrally molded.

Referring to FIG. 3, in the vehicle door according to the exemplary embodiment of the present disclosure, the window frame 23 is manufactured as an aluminum injection product formed integrally by aluminum injection molding using an aluminum alloy.

A coupling portion 25 where a plurality of penetration holes H are formed at regular intervals along a lower end portion, which is coupled with the module body 21, is insert-injection molded in the window frame 23.

In addition, a groove G formed in a constant shape is formed along a length direction of the coupling portion 25 in the window frame 23.

That is, the groove G is formed as a groove of a certain width and a certain depth while having a certain distance along the molding line at the lower end of the coupling portion 25 of the window frame 23.

Here, the groove G may divide the window frame 23 and the module body 21 as a boundary therebetween.

In addition, the groove G may serve to seal in response to the injection pressure of the plastic resin in the process of injection molding the module body 21 so that the coupling portion 25 of the window frame 23 is inserted at the upper end of the module body 21.

The plurality of penetration holes H may be formed at regular intervals along a lower side of the groove G.

Meanwhile, in the exemplary embodiment of the present disclosure, the penetration hole H is formed in the shape of a quadrangle, but the present disclosure is not limited thereto, and may have various shapes that enable inflow and curing of the plastic resin in insert-injection molding of the module body 21.

Referring to FIG. 4, in injection molding of the plastic resin, the coupling portion 25 of the window frame 23 is insert-injection molded to the upper end portion of the module body 21.

Here, the window frame 23 may be structurally coupled to the upper end portion of the module body 21 without having an additional engaging element since the plastic resin is cured while being introduced through the plurality of penetration holes H formed in the coupling portion 25.

Figure 5:
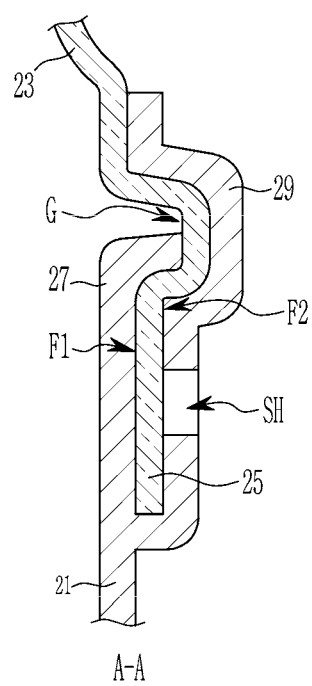
FIG. 5 is a cross-sectional view of FIG. 4, taken along the line A-A.
Figure 6:
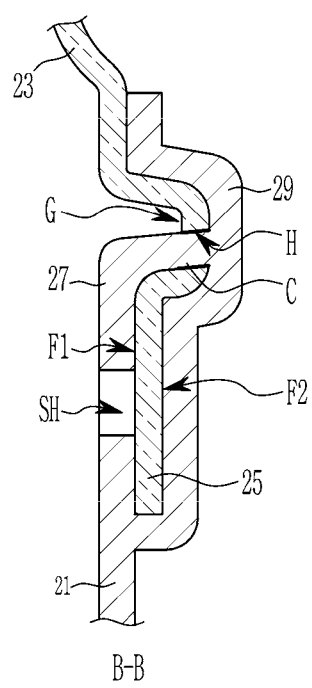
FIG. 6 is a cross-sectional view of FIG. 4, taken along the line B-B.

FIG. 5 and FIG. 6 are cross-sectional views of FIG. 4, taken along the lines A-A and B-B.

Referring to FIG. 5 and FIG. 6, the window frame 23 is injection-molded while an interior surface F1 and an exterior surface F2 of the coupling portion 24 are inserted between an inner end 27 and an outer end 29 of an upper end of the module 21.

In this case, in the injection-molding of the plastic resin, a stopper hole SH to which a stopper (not shown) of each mold provided in an upper mold (not shown) and a lower mold (not shown) is inserted may be formed in the inner end 27 and the outer end 29 of the upper end to support the coupling portion 25 of the window frame 23 on opposite sides.

Here, the stopper hole SH is formed in each of the inner end 27 of the module body 21 corresponding to a lower portion of each penetration hole H of the coupling portion and the outer end 29 of the module body 21 corresponding to a lower portion between the respective penetration holes H of the coupling portion 25.

That is, the stopper hole SH may be formed to cross each of the inner end 27 and the outer end 29 of the module body 21 along the coupling portion 25 of the window frame 23, respectively.

In addition, the tip of the inner end 27 in the module body 21 is formed to be in contact with the interior surface of the groove G formed in the coupling portion 25. Further, the outer end 29 is formed to surround the exterior surface of the groove G formed in the coupling portion 25.

Here, a connection portion C connecting the inner end 27 to the outer end 29 through the penetration hole H formed in the groove G may be formed in the module body 21.

That is, the connection portion C is formed during injection-molding of the module body 21, while the plastic resin introduced through the penetration hole H of the coupling part 25 is cured.

As described, the vehicle door according to the exemplary embodiment of the present disclosure having the structure as described above is manufactured by molding the window frame 23 included in the door module 20 into a separate aluminum injection product, and thus the weight can be reduced compared to the existing one, and strength of the window frame 23 can be enhanced.

In addition, when the coupling portion 25 coupled with the module body 21 is integrally formed in the lower portion of the window frame 23 and the coupling portion 25 is insert-injection molded to the module body 21, coupling strength of the window frame 23 and the module body 21 can be enhanced through structural coupling through which a plastic resin is introduced through the plurality of penetration holes H into the coupling portion 23 and cured.

In addition, the groove G is formed along the coupling portion 25 coupled to the module body 21, and thus the module body 21 can be easily distinguished, and the groove G may serve to seal corresponding to injection pressure of the plastic resin in injection molding of the module body 21.

As described, in the vehicle door according to the exemplary embodiment of the present disclosure, the window frame 23 is integrally formed of an aluminum injection product such that the bending and torsional strength can be enhanced while reducing the thickness compared to the existing one, thereby preventing deformation due to external force without having an additional reinforcement member.

Further, in the present disclosure, the bonding strength of the window frame 23 and the module body 21 can be increased by the penetration hole H and the groove G such that it is possible to prevent the window frame 23 from being separated or detached from the module body 21.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A vehicle door comprising:
a door panel formed by bonding a door outer panel and a door inner panel;
a door module comprising a module body and a window frame, and coupled to an inner side of the door inner panel; and
a door trim coupled to an inner side of the door module,
wherein the window frame is integrally formed through aluminum injection molding, and forms a coupling portion where a plurality of penetration holes are formed at a regular interval along a lower end portion that is coupled to the module body, and
during injection molding of a plastic resin, the coupling portion of the module body is insert-injection molded to the module body such that the plastic resin is structurally coupled by being cured while being introduced through the plurality of penetration holes formed in the coupling portion; and
wherein, in the window frame, a groove is formed in a constant shape along a length direction of the coupling portion.

2. The vehicle door of claim 1, wherein the plurality of penetration holes are formed along an interior surface of the groove.

3. The vehicle door of claim 2, wherein the plurality of penetration holes are formed in the shape of a quadrangle.

4. The vehicle door of claim 1, wherein an interior surface and an exterior surface of the coupling portion of the window frame are insert-injection molded between an inner end and an outer end at an upper end portion of the module body.

5. The vehicle door of claim 4, wherein, during the injection molding, a stopper hole for insertion of a stopper of each mold is formed in each of the inner end and the outer end of the module body to support the coupling at opposite sides.

6. The vehicle door of claim 5, wherein the stopper hole is formed in each of an inner end of the module body, corresponding to a lower portion of each penetration hole formed in the coupling portion, and an outer end of the module body, corresponding to a lower portion between the respective holes of the coupling portion.

7. The vehicle door of claim 4, wherein a front end of the inner side is formed in an interior surface of the groove formed in the coupling portion, and the outer end is formed to surround an exterior surface of the groove formed in the coupling portion.

8. The vehicle door of claim 4, wherein a connection portion that connects the inner end and the outer end through the penetration hole formed in the groove is formed in the module body.

* * * * *